United States Patent
Anschuetz et al.

(10) Patent No.: US 9,751,605 B1
(45) Date of Patent: Sep. 5, 2017

(54) SYSTEM AND METHOD FOR TRIMMING A TRIMMABLE MARINE DEVICE WITH RESPECT TO A MARINE VESSEL

(71) Applicant: Brunswick Corporation, Lake Forest, IL (US)

(72) Inventors: Steven M. Anschuetz, Fond du Lac, WI (US); Steven J. Andrasko, Oshkosh, WI (US); Andrew J. Przybyl, Berlin, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 15/003,326

(22) Filed: Jan. 21, 2016

Related U.S. Application Data

(60) Provisional application No. 62/272,140, filed on Dec. 29, 2015.

(51) Int. Cl.
   *B63H 20/10* (2006.01)
(52) U.S. Cl.
   CPC .................................. *B63H 20/10* (2013.01)
(58) Field of Classification Search
   None
   See application file for complete search history.

(56) References Cited

U.S. PATENT DOCUMENTS

| | | |
|---|---|---|
| 3,682,127 A | 8/1972 | Waquet |
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |

(Continued)

FOREIGN PATENT DOCUMENTS

EP          2368791 B1       1/2013

OTHER PUBLICATIONS

Andrasko et al., "Systems and Methods for Automatically Controlling Attitude of a Marine Vessel with Trim Devices", Unpublished U.S. Appl. No. 14/873,803, filed Oct. 2, 2015.

(Continued)

*Primary Examiner* — Redhwan K Mawari
*Assistant Examiner* — Edward Torchinsky
(74) *Attorney, Agent, or Firm* — Andrus Intellectual Property Law, LLP

(57) ABSTRACT

A method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

20 Claims, 9 Drawing Sheets

(56) References Cited

U.S. PATENT DOCUMENTS

| | | |
|---|---|---|
| 4,565,528 A | 1/1986 | Nakase |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,007,866 A | 4/1991 | Okita |
| 5,113,780 A | 5/1992 | Bennett et al. |
| 5,118,315 A | 6/1992 | Funami et al. |
| 5,142,473 A | 8/1992 | Davis |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,095,077 A | 8/2000 | DeAgro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,458,003 B1 | 10/2002 | Krueger |
| 6,583,728 B1 | 6/2003 | Staerzl |
| 6,733,350 B2 | 5/2004 | Lida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B2 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,762,022 B1 | 6/2014 | Arbuckle et al. |
| 8,807,059 B1 | 8/2014 | Samples et al. |
| 8,840,439 B1 | 9/2014 | Wiatrowski et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,156,536 B1 | 10/2015 | Arbuckle et al. |
| 9,278,740 B1 | 3/2016 | Andrasko et al. |
| 9,290,252 B1 | 3/2016 | Tuchscherer et al. |
| 9,381,989 B1 | 7/2016 | Poirier |
| 2003/0013359 A1 | 1/2003 | Suganuma et al. |
| 2004/0224577 A1 | 11/2004 | Kaji |
| 2005/0245147 A1 | 11/2005 | Takada |
| 2007/0089660 A1 | 4/2007 | Bradley et al. |
| 2011/0263167 A1 | 10/2011 | Chiecchi |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1* | 10/2014 | Kuriyagawa .......... B63H 20/10 440/1 |
| 2016/0068247 A1 | 3/2016 | Morvillo |

OTHER PUBLICATIONS

Anschuetz et al., "System and Method for Trimming a Trimmable Marine Device With Respect to a Marine Vessel", Unpublished U.S. Appl. No. 15/003,326, filed Jan. 21, 2016.

Anschuetz et al., "System and Method for Trimming Trimmable Marine Devices With Respect to a Marine Vessel", Unpublished U.S. Appl. No. 15/003,335, filed Jan. 21, 2016.

O'Brien et al., "Systems and Methods for Setting Engine Speed Relative to Operator Demand", Unpublished U.S. Appl. No. 14/684,952, filed Apr. 13, 2015.

Dengel et al., "Trim Control Systems and Methods for Marine Vessels", Unpublished U.S. Appl. No. 13/770,591, filed Feb. 19, 2013.

Mercury Marine, 90-8M0076286 JPO Service Manual—Auto Trim Portion, Theory of Operation, Jul. 2013, p. 2A-5.

Mercury Marine, 90-8M0076286 JPO Service Manual—Auto Trim Portion, Section 2—On the Water, May 2013, p. 21.

Andrasko et al., "Systems and Methods for Providing Notification Regarding Trim Angle of a Marine Propulsion Device", Unpublished U.S. Appl. No. 14/573,200, filed Dec. 17, 2014.

Andrasko et al., "System and Method for Controlling Attitude of a Marine Vessel Having Trim Tabs", Unpublished U.S. Appl. No. 14/472,565, filed Aug. 29, 2014.

Andrasko et al., "Systems and Methods for Controlling Movement of Drive Units on a Marine Vessel", Unpublished U.S. Appl. No. 14/177,762, filed Feb. 11, 2014.

Mercury Marine, 90-8M0081623 JPO Owners Manual—Auto Trim Portion, Section 2—On the Water, May 2013, p. 21.

* cited by examiner

| ACCELERATION RATE | -400 | -300 | -200 | -100 | 0 | 100 | 200 | 300 | 400 |
|---|---|---|---|---|---|---|---|---|---|
| RANGE FROM TARGET | -- | -- | -- | X | -- | -- | -- | Y | -- |

SYSTEM AND METHOD FOR TRIMMING A TRIMMABLE MARINE DEVICE WITH RESPECT TO A MARINE VESSEL

CROSS-REFERENCE TO RELATED APPLICATION

The present application claims the benefit of U.S. Provisional Application Ser. No. 62/272,140, filed Dec. 29, 2015, which is hereby incorporated by reference.

FIELD

The present disclosure relates to systems and methods for trimming trimmable marine devices with respect to a transom of a marine vessel.

BACKGROUND

U.S. Pat. No. 4,318,699, incorporated by reference herein, discloses a sensor that responds to the operation of a marine transportation system to sense on-plane and off-plane conditions of a boat to operate a trim control to automatically position a trimmable drive for a desired boating operation. The preferred embodiment senses engine speed while an alternative embodiment senses fluid pressure opposing boat movement. The drive is moved to an auto-out position at high speeds and to a trimmed-in position at lower speeds.

U.S. Pat. No. 4,490,120, incorporated by reference herein, discloses A hydraulic system for trimming and tilting an outboard propulsion unit, which includes both trim piston-cylinder units and a trim-tilt piston-cylinder unit. The flow of hydraulic fluid from the reversible pump is controlled by a spool valve. A pressure relief valve is mounted in the spool to maintain pressure on one side of the spool when the pump is turned off to rapidly close the return valve and prevent further movement of the piston-cylinder units.

U.S. Pat. No. 4,861,292, incorporated by reference herein, discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391, incorporated by reference herein, discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,347,753, incorporated by reference herein, discloses a hydraulic system for a sterndrive marine propulsion device that directs the flow of hydraulic fluid through the body and peripheral components of a gimbal ring in order to reduce the number and length of flexible hydraulic conduits necessary to conduct pressurized hydraulic fluid from a pump to one or more hydraulic cylinders used to control the trim or tilt of a marine drive unit relative to a gimbal housing.

U.S. Pat. No. 7,416,456, incorporated by reference herein, discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820, incorporated by reference herein, discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

Unpublished U.S. patent application Ser. No. 14/873,803, filed Oct. 2, 2015, and assigned to the Applicant of the present application, which is incorporated by reference herein, discloses systems and methods for controlling position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband. The method may include sending a second control signal for a defined brake time to trim the drive unit in an opposite, second direction in response to a determination that the actual trim position has one of achieved and exceeded the target trim position.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel, wherein the acceleration rate has a magnitude. In response to determining that the trim position error exceeds a first error threshold and the magnitude of the acceleration rate exceeds a given rate threshold, the controller commands the marine device to the target trim position. In response to determining that the trim position error exceeds the first error threshold and the magnitude of the acceleration rate does not exceed the given rate threshold, the controller commands the marine device to a setpoint trim position that is different from the target trim position.

According to another example disclosed herein, a system for controlling a trim position of a trimmable marine device with respect to a marine vessel to which the trimmable marine device is coupled includes a controller that determines a target trim position of the marine device based on a condition of the marine vessel. A trim position sensor senses an actual trim position of the marine device and sends actual trim position information to the controller. A trim actuator is coupled to the marine device and configured to rotate the marine device about a horizontal trim axis in response to commands from the controller. The controller determines at least a magnitude of an acceleration rate of the marine vessel, and in response to determining that the magnitude of the acceleration rate exceeds a given rate threshold, the controller commands the trim actuator to rotate the marine device until the trim position sensor indicates that the actual trim position equals the target trim position. In response to determining that the magnitude of the acceleration rate does not exceed the given rate threshold, the controller commands the trim actuator to rotate the marine device until the trim position sensor indicates that the actual trim position equals a setpoint trim position that is different from the target trim position.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
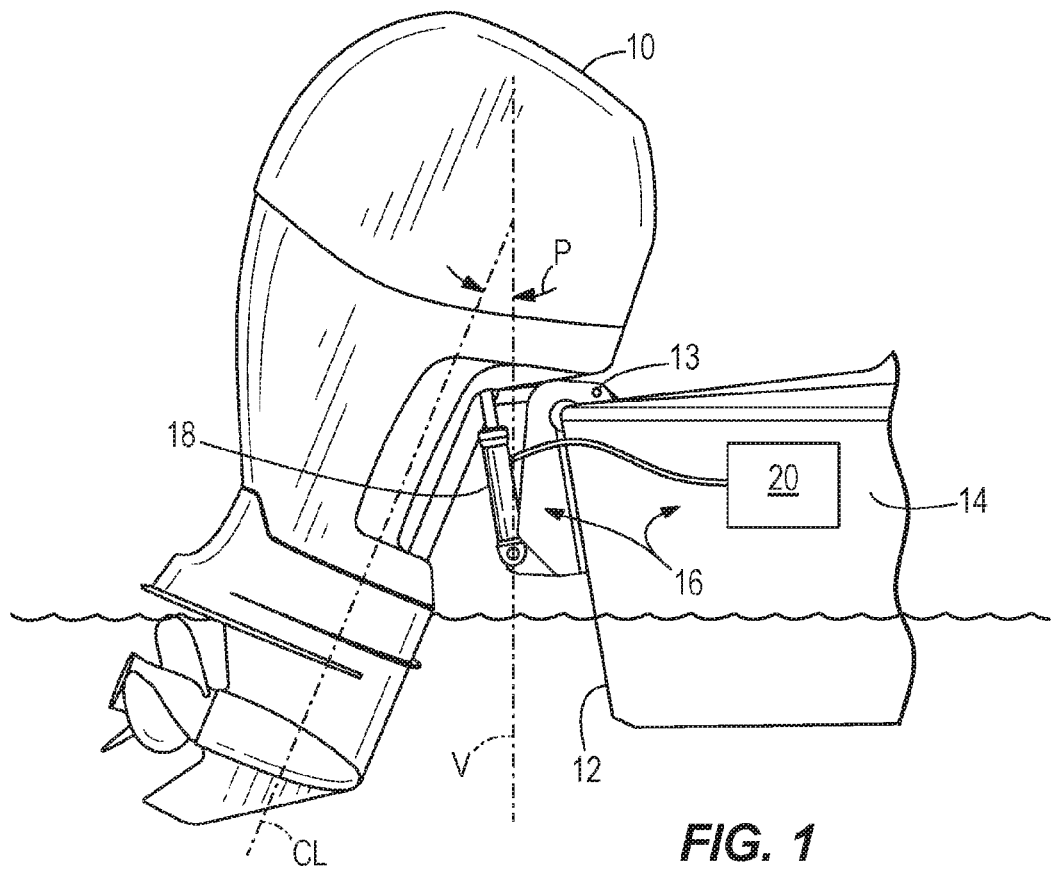
FIG. 1 illustrates one example of a trimmable marine device according to the present disclosure.

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling one or more trim actuators on a marine vessel so as to control a relative position of a trimmable marine device with respect to the marine vessel. In one example, the trim actuator is a hydraulic piston-cylinder assembly in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of the trim actuator can be used to rotate a trimmable marine device up and down with respect to a marine vessel to which it is coupled. Examples of such a trimmable marine device include, but are not limited to: trim tabs, trim deflectors, trim interceptors, and/or marine propulsion devices such as outboard motors or lower units of stern drives.

Those skilled in the art of marine vessel propulsion and control are familiar with many different ways in which the trim angle of a marine device such as an outboard motor or stern drive can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices.

The systems of the present disclosure are also capable of carrying out automatic trim (auto-trim) methods, in which the marine device is automatically trimmed up or down with respect to its current position, depending on a desired attitude of the marine vessel with respect to vessel speed. Auto-trim systems perform trim operations automatically, as a function of vessel speed, without requiring intervention by the operator of the marine vessel. The automatic change in trim angle of the trimmable marine device enhances the operation of the marine vessel as it achieves planing speed and as it further increases its velocity over the water while on plane. For example, trimming the marine device can affect a direction of thrust of a propeller with respect to a vessel transom, as well as affect vessel roll and pitch.

Referring to FIG. 1, the position of a trimmable marine device 10 (such as the outboard motor shown herein) with respect to the transom 12 of a marine vessel 14 is controlled by a trim actuator 16. The trim actuator 16 may comprise a hydraulic piston-cylinder assembly 18 connected to a hydraulic pump-motor combination 20. The piston-cylinder assembly 18 has a first end (here, the cylinder end) coupled to the transom 12 of the vessel 14 and a second, opposite end (here, the rod end) coupled to the marine device 10, as known to those having ordinary skill in the art. The piston-cylinder assembly 18 operates to rotate the marine device 10 about a horizontal trim axis 13 to a trimmed-out position, to a trimmed-in position, or to maintain the marine device 10 in any position therebetween as the pump-motor combination 20 provides hydraulic fluid to the piston-cylinder assembly 18 to move the piston within the cylinder. As mentioned, however, other types of hydro-mechanical or electro-mechanical actuators could be used in other examples.

Figure 2:
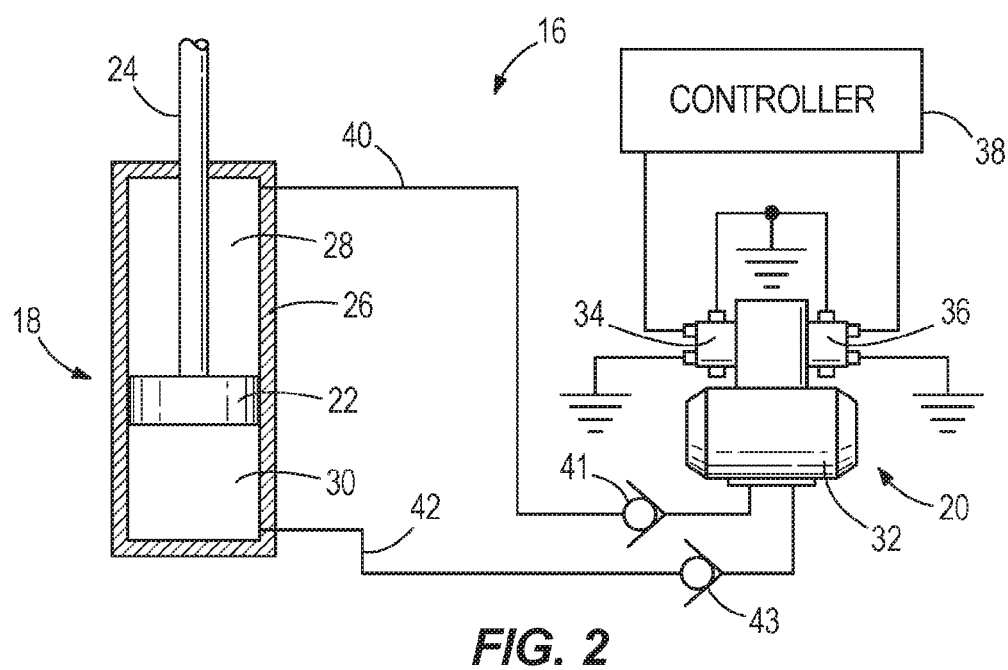
FIG. 2 illustrates a schematic of a trim actuator according to the present disclosure.

One example of a hydraulic trim actuator 16 is shown in FIG. 2. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a pump-motor 32 connected to a trim-in relay 34 and a trim-out relay 36. In other examples, the trim-in relay 34 and the trim-out relay 36 are a single relay that can turn the pump-motor 32 on or off and can effect a trim-in or trim-out movement of the trim actuator 16. The relays 34 and 36 are connected to a controller 38 that controls energizing of solenoids in the relays 34 and 36, which act as switches to couple a power source such as a battery (not shown) to the pump-motor 32. A first hydraulic line 40 couples the pump-motor 32 to a first chamber 28 of the piston-cylinder assembly 18, and a second hydraulic line 42 couples the pump-motor 32 to the second chamber 30 of the piston-cylinder assembly 18. As long as the trim-in relay 34 is activated, the pump-motor 32 provides hydraulic fluid through the first hydraulic line 40 to the first chamber 28 of the piston-cylinder assembly 18, thereby pushing the piston 22 downwardly within the cylinder 26 and lowering (trimming in) the marine device 10 coupled to the rod 24. As long as the trim-out relay 36 is activated, the pump-motor 32 provides hydraulic fluid through the second hydraulic line 42 to the second chamber 30 of the piston-cylinder assembly 18, thereby pushing the piston 22 upwardly within the cylinder 26 and raising (trimming out) the marine device 10 coupled to the rod 24. Hydraulic fluid can be removed from the opposite chamber 28 or 30 of the cylinder 26 into which fluid is not being pumped in either instance, and drained to a tank or circulated through the pump-motor 32.

In this way, the trim actuator 16 can position the marine device 10 at different angles with respect to the transom 12. These may be a neutral (level) trim position, in which the marine device 10 is in more or less of a vertical position; a trimmed in (trimmed down) position; or a trimmed out (trimmed up) position. A trimmed out position, as shown in FIG. 1, is often used when the marine vessel is on plane and high speeds are required. At high speeds, the trimmed out position causes the bow of the marine vessel 14 to rise out of the water, resulting in better handling and increased fuel efficiency. Thus, many auto-trim algorithms include determining a target trim position at which to orient the marine device 10 with the controller 38 based on vessel speed. In other examples, the target trim position may be based on engine speed, a combination of vessel speed and engine speed, or a tradeoff between vessel speed and engine speed depending on additional vessel conditions. The controller 38 may define the target trim position by reference to a vertical line V. When the centerline CL of the marine device 10 is parallel to the vertical line V, the controller 38 may consider this to be zero trim. Non-zero trim can be quantified as a value P, which represents the angle between the centerline CL of the marine device 10 and the vertical line V. This value P can be expressed as an angle, a percentage of a total angle to which the marine device 10 can be trimmed, a scalar value, a polar coordinate, or any other appropriate unit. For purposes of the description provided herein below, the angle P will be expressed as a percentage of total allowable trim angle, which can be measured from vertical, from a fully trimmed-out position, or from a fully-trimmed in position.

Figure 3:
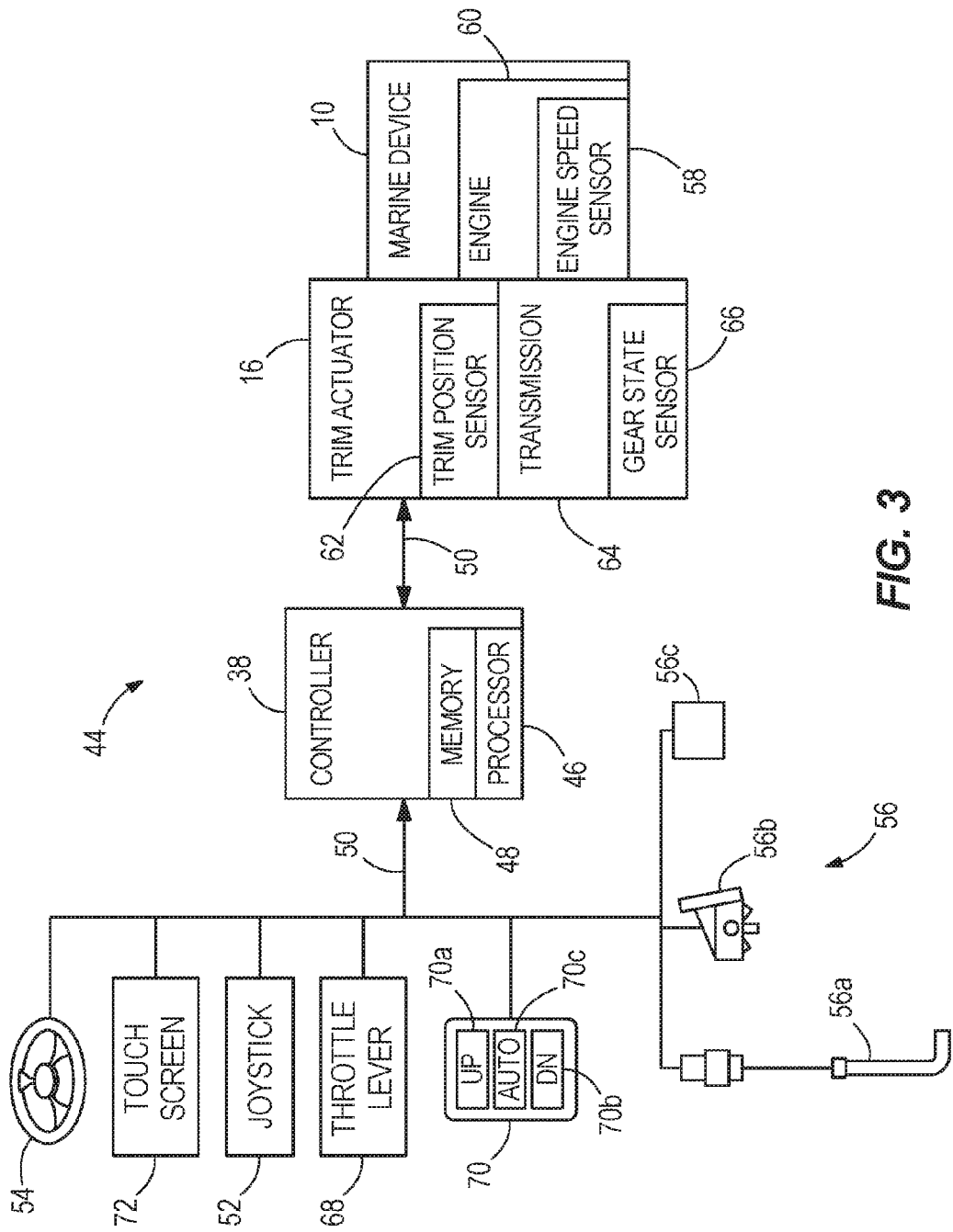
FIG. 3 illustrates a control system according to one example of the present disclosure.

FIG. 3 shows a schematic of a system 44 associated with the marine vessel 14 of FIG. 1. In the example shown, the system 44 includes the controller 38, which is programmable and includes a processor 46 and a memory 48. The controller 38 can be located anywhere in the system 44 and/or located remote from the system 44 and can communicate with various components of the marine vessel 14 via wired and/or wireless links, as will be explained further herein below. Although FIG. 3 shows a single controller 38, the system 44 can include more than one controller 38. For example, the system 44 can have a controller 38 located at or near a helm of the marine vessel 14 and can also have one or more controllers located at or near the marine device 10. Portions of the method disclosed herein below can be carried out by a single controller or by several separate controllers. Each controller 38 can have one or more control sections or control units. One having ordinary skill in the art will recognize that the controller 38 can have many different forms and is not limited to the example that is shown and described. For example, here the controller 38 carries out the trim control method for the entire system 44, but in other examples separate trim control units and propulsion control units could be provided.

In some examples, the controller 38 may include a computing system that includes a processing system, storage system, software, and input/output (I/O) interfaces for communicating with devices such as those shown in FIG. 3, and about to be described herein. The processing system loads and executes software from the storage system, such as software programmed with a trim control method. When executed by the computing system, trim control software directs the processing system to operate as described herein below in further detail to execute the trim control method. The computing system may include one or many application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 48) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 38 communicates with one or more components of the system 44 via a communication link 50, which can be a wired or wireless link. The controller 38 is capable of monitoring and controlling one or more operational characteristics of the system 44 and its various subsystems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50 in fact provides communication between the controller 38 and each of the sensors, devices, etc. described herein, although not every connection is shown in the drawing for purposes of clarity.

As mentioned, the controller 38 receives inputs from several different sensors and/or input devices aboard or coupled to the marine vessel 14. For example, the controller 38 receives a steering input from a joystick 52 and/or a steering wheel 54. The controller 38 is provided with an input from a vessel speed sensor 56. The vessel speed sensor 56 may be, for example, a pitot tube sensor 56a, a paddle wheel type sensor 56b, or any other speed sensor appropriate for sensing the actual speed of the marine vessel. The vessel speed may instead be obtained by taking readings from a GPS device 56c, which calculates speed by determining how far the vessel 14 has traveled in a given amount of time. The marine device 10 is provided with an engine speed sensor 58, such as but not limited to a tachometer, that determines a speed of the engine 60 powering the marine device 10 in rotations per minute (RPM). The engine speed can be used along with other measured or known values to approximate a vessel speed (i.e., to calculate a pseudo vessel speed). A trim position sensor 62 is also provided for sensing an actual position of the trim actuator 16, for example, by measuring a relative position between two parts associated with the trim actuator 16. The trim position sensor 62 may be any type of sensor known to those having ordinary skill in the art, for example a Hall effect sensor or a potentiometer. A transmission 64 and gear state sensor 66 can also be provided for the marine device 10. FIG. 3 shows an instance in which the marine device 10 is an outboard motor, but in the instance that the marine device 10 is, for example, a stern drive or a trim tab, the transmission, engine, and their associated components would not be coupled to the trim actuator 16 as shown herein.

Other inputs to the system 44 can come from operator input devices such as a throttle lever 68, a keypad 70, and a touchscreen 72. The throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70a, a "trim down" button 70b, and an "auto-trim on/resume" button 70c. The touchscreen 72 can also be used to initiate or exit any number of control or operation modes (such as trim up, trim down, or auto-trim mode), and in that case the inputs can be buttons in the traditional sense or selectable screen icons. The touchscreen 72 can also display information about the system 44 to the operator of the vessel, such as engine speed, vessel speed, trim angle, trim operating mode, vessel acceleration rate, etc.

One issue with many auto-trim systems is that trim actuators 16 are often controlled according to discrete steps and are thus actuated to be either on or off. Generally, when a relay (such as trim-in relay 34 or trim-out relay 36, FIG. 2) is energized for a specific amount of time in order to activate the trim actuator 16, the system will either overshoot or undershoot the target trim position by a small amount due to inertia of the trim pump-motor 32, time required for pump check valves (see 41, 43, FIG. 2) to fully close, expansion of the hydraulic lines 40, 42, length of the hydraulic lines, etc. This makes it difficult to hit an exact trim position. Other issues that may contribute to the inaccuracy of some trim positions is that some trim position sensors 62 have a bowtie configuration instead of a Hall effect, which bowtie configuration has production tolerances and/or slop. Thus, a trim control system 44 that uses a closed-loop method (wherein the relays 34, 36 are de-energized once the trim position sensor 62 senses that the actual position of the trimmable marine device 10 is equal to a target position) will often result in coasting of the trim actuator 16 beyond the target position, which coasting is caused by the above-mentioned overshoot and undershoot factors.

Figure 4:
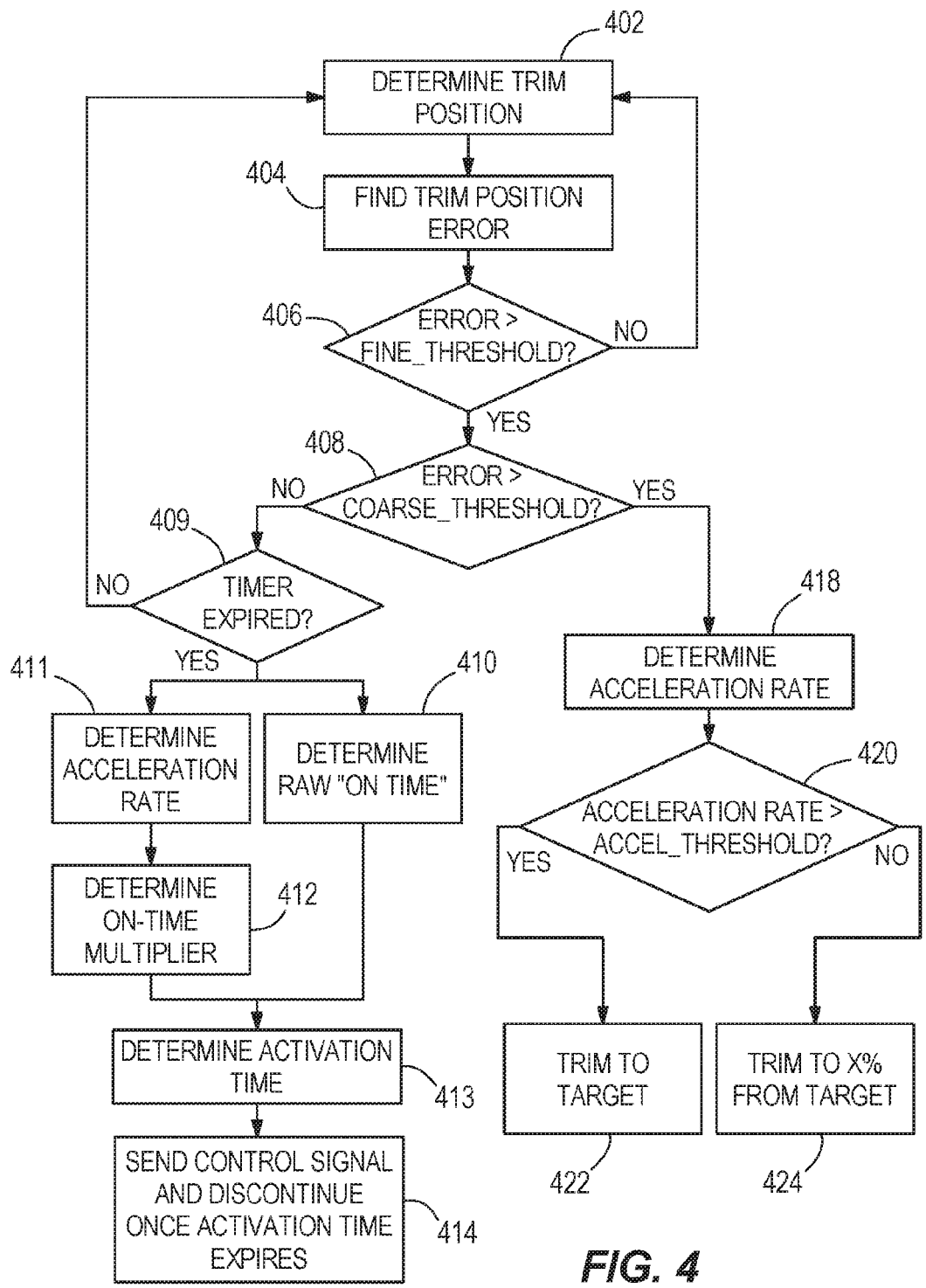
FIG. 4 shows a method according to one example of the present disclosure.

A method for controlling a trim system on a marine vessel according to the present disclosure is shown in FIG. 4. As shown at 402, the method begins by determining a trim position of the trimmable marine device 10, such as with trim position sensor 62. The actual trim position of the trimmable marine device 10 is received at the controller 38. The controller 38 then determines a trim position error by comparing the actual trim position to a target trim position, as shown at 404 (e.g., by subtracting one from the other). The method next includes determining if the error exceeds a first error threshold, herein referred to as a "fine threshold," as shown at 406. If YES, the method may also include comparing the trim position error to a second error threshold ("coarse threshold"), as shown at 408. Depending on the determinations made in boxes 402 to 408, the method may next continue to box 409 or box 418. The method of boxes 409 to 414 is the subject of Applicant's co-pending Provisional Application Ser. No. 62/272,140, filed Dec. 29, 2015, incorporated by reference herein, and will not be described further herein. The method of boxes 418 to 424 is the subject of the present application, and will be described further herein below. It should be noted that the present method may skip box 408 and may proceed directly from box 406 to box 418. Alternatively, the method may skip both boxes 406 and 408 and may proceed directly from box 404 to box 418. In other examples, some of the steps in the boxes may be carried out simultaneously or in a different order than that shown herein. Thus, unless logic dictates otherwise, the order of the boxes shown herein is not limiting on the scope of the present claims.

As shown in box 418, the present method includes determining an acceleration rate of the marine vessel 14. This may be done by the controller 38 calculating a change in the velocity of the vessel 14 over time, or may be calculated by a program contained within the GPS device 56c and subsequently provided to the controller 38. In yet another example, the acceleration rate can be measured directly from an attitude heading reference sensor (AHRS), which measures via an accelerometer rather than by calculating change in speed over change in time. In any case, the acceleration rate has a magnitude (for example, in meters per second squared) and a sign (such as negative for deceleration and positive for acceleration). The controller 38 then compares the magnitude of the acceleration rate to an acceleration rate threshold, as shown in box 420. In some examples, the magnitude of the rate threshold may differ based on the sign of the acceleration rate, as will be seen herein below. In response to determining that the trim position error exceeds the first error threshold (YES at box 406) and the magnitude of the acceleration rate exceeds the given rate threshold (YES at box 420), the method includes commanding the marine device 10 to the target trim position with the controller 38, as shown at box 422. On the other hand, in response to determining that the trim position error exceeds the first error threshold (YES at box 406) and the magnitude of the acceleration rate does not exceed the given rate threshold (NO at box 420), the method includes commanding the marine device 10 to a setpoint trim position that is different from the target trim position. In one example, this means the controller 38 commands the marine device 10 to a setpoint trim position that is a given range (e.g., X %) from the target trim position, as shown at box 424. In the example described herein below with respect to FIGS. 5 and 6, the determination as to whether the acceleration rate is above or below the rate "threshold" is not necessarily a separate step in which the controller 38 makes a YES or NO determination. Rather, the rate threshold is implemented via the use of a look-up table 74 (FIG. 5) or similar input-output map that equates all acceleration rates greater than a given positive rate and all acceleration rates less than a given negative rate to a differential of 0% between the setpoint trim position and the target trim position.

In the event that step 406 is present, it provides a way to ensure that the trim system is only correcting trim position errors that are significant enough to have an affect on the handling of the vessel 14, or large enough that the trim actuator 16 is able to move a small enough amount to correct them. If the determination at box 406 is NO, then the method returns to box 402, and will cycle until a trim position error greater than the first error threshold accumulates. In one example, the first error threshold is 2.5%. In the event step 408 is included, it provides a way to distinguish between a relatively large trim error and a relatively small trim error. The method of the present disclosure works best for correcting large (or "coarse") errors, as it relies on feedback from the trim position sensor 62 to work and thus has an inherent delay. Therefore, the method of the present disclosure may include comparing the trim position error to the second error threshold, and commanding the marine device 10 to either the target trim position (box 422) or the setpoint trim position (box 424) in response to the trim position error exceeding both the first error threshold as determined at box 406 and the second error threshold as determined at box 408. In one example, the second error threshold is 4.0%.

In one example, commanding the marine device 10 to the target trim position comprises commanding the trim actuator 16 to move the marine device 10 toward the target trim position until the controller 38 determines that the actual trim position as measured by the trim position sensor 62 is equal to the target trim position. Similarly, commanding the marine device 10 to the setpoint trim position comprises commanding the trim actuator 16 to move the marine device 10 toward the target trim position until the controller 38 determines that the actual trim position as measured by the trim position sensor 62 is within a given range of the target trim position.

In one example of the present disclosure, the given range is a calibrated value that is intended to allow the trim actuator 16 and marine device 10 to coast from the setpoint trim position to the target trim position. In this manner, the present method takes advantage of the overshoot present in a hydraulic trim system by de-energizing the trim relay 34 or 36 once the trim position sensor 62 senses that the actual trim position is equal to the setpoint trim position, which setpoint trim position is a calibrated amount away from (within a given range of) the target trim position. As the trim actuator 16 continues to move even after the trim relay 34 or 36 is no longer energized, the marine device 10 coasts through the calibrated angular amount and reaches the target trim position.

Figures 5, 6:
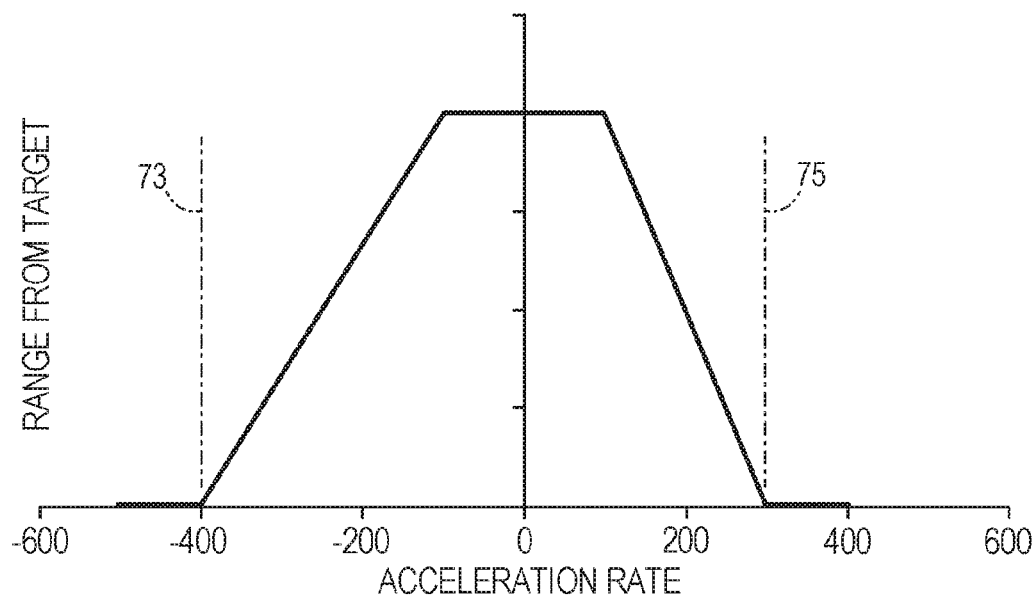
FIG. 5 shows a table including calibrated values according to one example of the present disclosure.
FIG. 6 illustrates one example of a relationship between an acceleration rate and a range between a target trim position and a setpoint trim position according to the present disclosure.

FIG. 5 illustrates one example of a look-up table 74 that can be stored in the memory 48 of the controller 38 for providing the given range within which the trim relay 34 or 36 is to be de-activated. The look-up table 74 contains a plurality of calibrated values, each calibrated value in the plurality of calibrated values being related to a given acceleration rate of the marine vessel 14. More specifically, the look-up table 74 is populated with a plurality of values that relate an acceleration rate of the vessel 14 (as an input) to a given range from the target position at which the relay is to be turned off (as an output). For example, when the acceleration rate is $-100$ m/s$^2$, the setpoint trim position may be X % away from the target trim position. When the acceleration rate is 300 m/s$^2$, the setpoint trim position may be Y % away from the target trim position. Whether the given range is added to or subtracted from the target to obtain the setpoint depends on the sign of the acceleration rate, as will be made clear herein below. Note that the units of m/s$^2$ for acceleration are used only as an example, and other units for acceleration could instead be used. For the trim positions in look-up table 74, percentages are also used merely as an example, and in other examples, the given ranges may be expressed as angles, scalar values, polar coordinates, linear positions of the rod 24 with respect to the cylinder 26, etc.

In one example, any given range read from the look-up table 74 is a calibrated value that depends on one or more of a time it takes a valve 41 or 43 between the pump-motor 32 and the piston-cylinder assembly 18 to close, an amount of expansion of the first and second hydraulic lines 40, 42, and inertia of the pump-motor 32. The calibrated value can be obtained by testing an actual trim system on a vessel and recording how much a particular system coasts at various acceleration rates. When a particular acceleration rate of the marine vessel 14 is not in the look-up table 74, the controller 38 interpolates the given range using a first calibrated value associated with an acceleration rate that is greater than the particular acceleration rate and a second calibrated value associated with an acceleration rate that is less than the particular acceleration rate, for example using linear interpolation. In fact, a look-up table 74 is not the only way to determine the given value. Instead, other input-output types of algorithms could be used, including but not limited to an equation saved in the memory 48 that takes into account the variables mentioned above, or a map, a graph, a chart, etc. Additionally, the look-up table 74 could instead be two separate look-up tables (or two separate input-output maps), with one having calibrated values for a trim-up event and the other having calibrated values for a trim-down command. Which of the input-output maps is accessed can be based on the sign of the trim position error, which indicates whether the marine device 10 needs to be trimmed up or down. Different relationships between acceleration rate and the given range will be apparent depending on whether the marine device 10 is an outboard or a stern drive, and thus each type of drive would need to be calibrated independently. Additionally, a system equipped with trim tabs might utilize vessel speed as the input instead of acceleration rate, because vessel speed can be used to approximate pressure on the trim tabs against which the tabs could coast.

It has already been discussed how when the magnitude of the acceleration rate is not greater than the rate threshold (box 420), the system trims the marine device 10 to the setpoint trim position, i.e., until the target trim position plus or minus the actual trim position is equal to the given value read from the look-up table 74. The marine device 10 then naturally coasts from this setpoint position to the target position due to inertia and the other factors tending to cause undershoot or overshoot mentioned hereinabove. However, if the magnitude of the acceleration rate exceeds the rate threshold (box 420), the system trims the marine device 10 all the way to the target. In this case, the value read from the look-up table 74 would be 0%. In other words, the setpoint trim position would be equal to the target trim position. This is apparent in the chart of FIG. 6, which shows two different rate thresholds: −400 m/s$^2$ (at threshold 73) and 300 m/s$^2$ (at threshold 75). The given range between the setpoint trim position and the target trim position is non-zero in all cases except for acceleration rates less than −400 m/s$^2$ or greater than 300 m/s$^2$, where the given range is 0%. Therefore, at acceleration rates below the exemplary −400 m/s$^2$ or above the exemplary 300 m/s$^2$, the controller 38 will energize the relay 34 or 36 until the actual trim position is equal to the target. The reasoning for this will be explained below. Note also that the chart in FIG. 6 displays one example of how the rate threshold has a different magnitude when the acceleration rate is negative (400 m/s$^2$) than when it is positive (300 m/s$^2$). Some systems might result in calibration wherein the rate thresholds for both acceleration and deceleration are the same, however. Note that all values shown in the chart are for exemplary purposes only, and different thresholds could be used.

It can be seen from examination of FIG. 6 that the given range (between the setpoint and the target) has a magnitude that is inversely related to the magnitude of the acceleration rate of the marine vessel 14. As magnitude of the acceleration rate increases, the given range linearly decreases. Other shapes of the curve in FIG. 6 are possible, such as ones without a plateau at very low acceleration rates, ones that relate to a quadratic equation, etc. Similar to the discussion of FIG. 5, the curve in FIG. 6 could actually be two separate curves, or the system might store and reference two separate charts altogether, for a trim-up event versus a trim-down event. Generally, auto-trim systems will command increased target trim positions as a vessel accelerates (i.e., as velocity increases), and decreased target trim positions as the vessel decelerates (i.e., as velocity decreases). As a vessel 14 accelerates, a load created by the thrust of the propulsion device opposes the upward force of the trim actuator 16 on the trimmable marine device 10. As a vessel 14 decelerates, a hydrodynamic load pushes up on the marine device 10 in opposition to the downward force of the trim actuator 16. At a lesser magnitude of acceleration, there is a lesser load to overcome, and thus the setpoint trim position can be set at a farther range from the target trim position: the trim system will coast up or down to where it needs to be. At a higher magnitude of acceleration, there is greater force tending to oppose the direction in which the system is trimming the marine device 10, and less coasting toward the target will occur. In other words, at higher magnitudes of acceleration rates, the given range between the target and the setpoint needs to be smaller.

Figure 7:
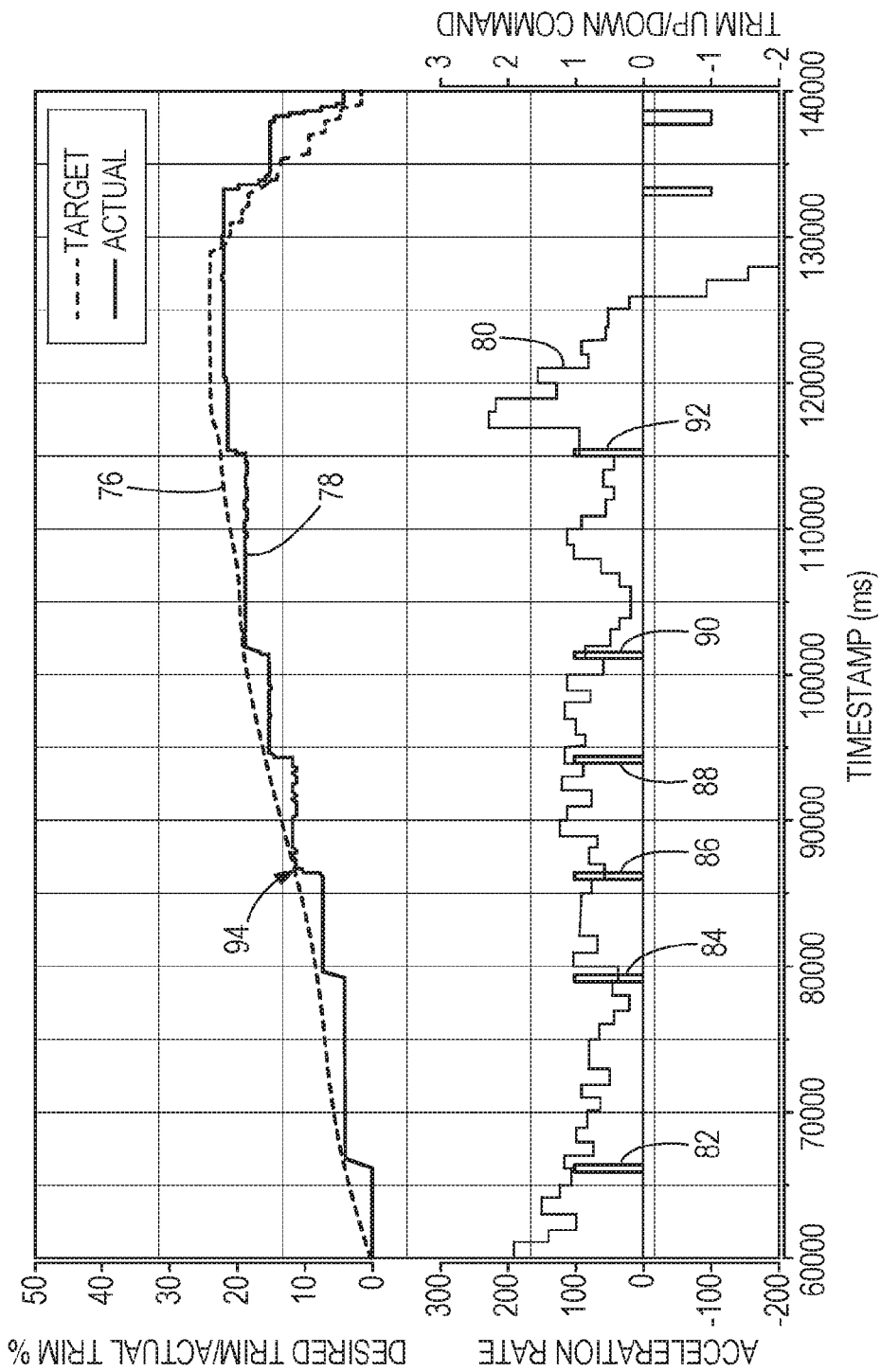
FIG. 7 is a chart showing a relationship between time and acceleration rate and between time and trim position when a vessel is slowly accelerating.
Figure 8:
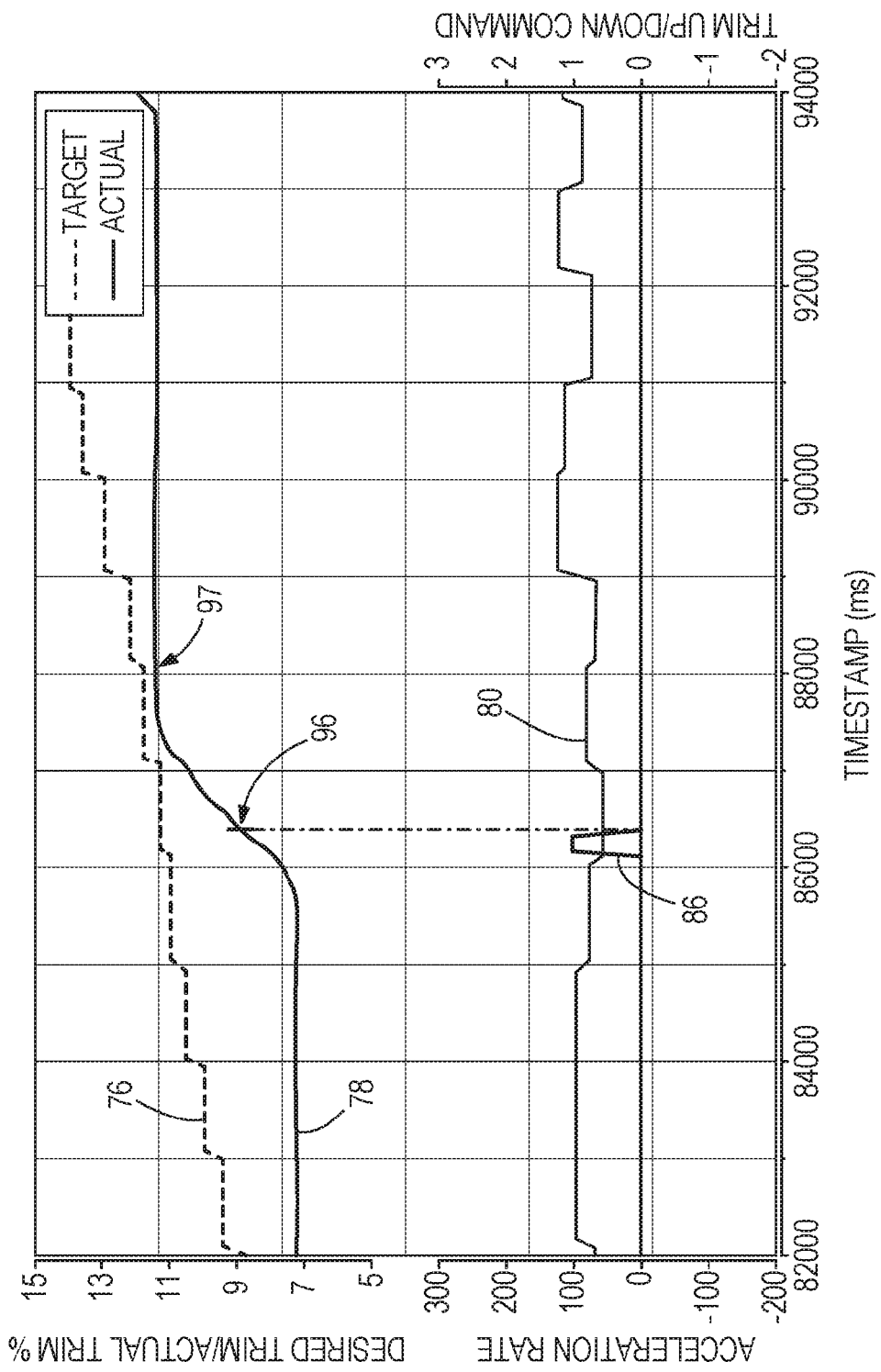
FIG. 8 is a zoomed-in view of a portion of FIG. 7.

FIG. 7 shows a situation in which a vessel 14 is slowly accelerating (i.e., is accelerating at a rate below the threshold rate). As shown in the bottom plot, the acceleration rate 80 has a relatively low magnitude and a positive sign. As shown in the upper plot, the curve 76 representing the target trim position (as determined by the auto-trim algorithm) is slowly increasing. The curve 78 representing the actual trim position is also increasing, in response to "trim-up" pulses 82, 84, 86, 88, 90, and 92 sent to the trim-out relay 36. Referring specifically to the response to pulse 86, following the method of the present disclosure ensures that the actual trim position at 94 is just about equal to the target trim position, with negligible or no overshoot. FIG. 8 shows a zoomed-in view of this same area. The trim-out pulse 86 begins at about 86100 mS in response to the controller 38 determining that the actual trim position at that time is less than the target trim position by greater than the rate threshold. The pulse 86 then stops at about 86400 mS, in response to the controller 38 determining that the actual trim position has reached the setpoint and is within the given range of the target (recall FIG. 5). Even though the trim-out relay 36 is thereafter de-energized, the actual trim position continues to coast as shown by curve 78 between arrows 96 and 97. At arrow 97, the actual trim position is about equal to the target trim position because the given range from look-up table 74 is a carefully calibrated amount that the trim system is expected to coast at the given acceleration rate. Thus, the method of the present disclosure includes setting the setpoint trim position to a value that is less than the target trim position when the acceleration rate is positive, after which the marine device coasts up to the target trim position. In other words, the given range is subtracted from the target trim position to obtain the setpoint trim position.

Figure 9:
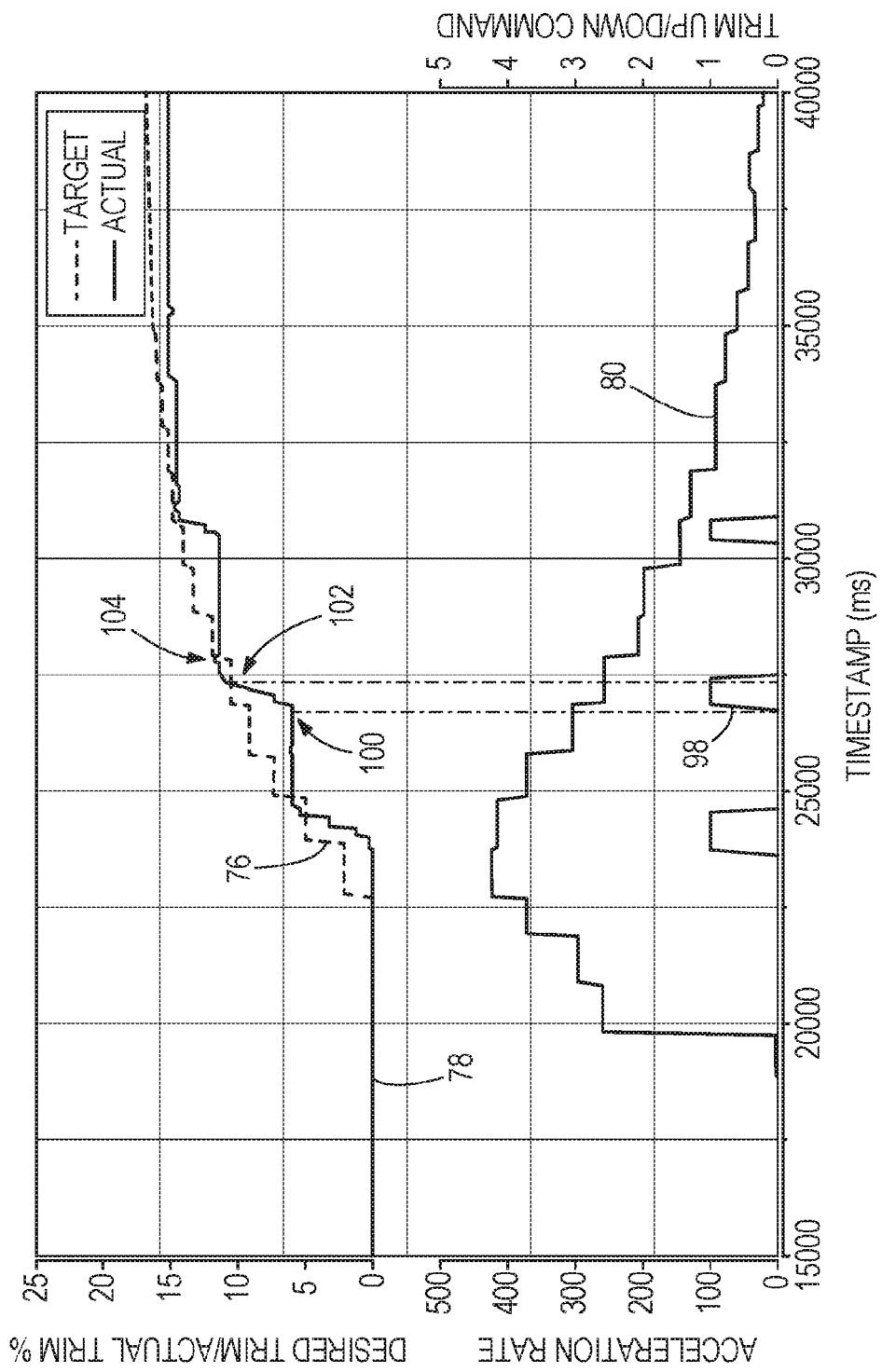
FIG. 9 is a chart showing a relationship between time and acceleration rate and between time and trim position when a vessel is quickly accelerating.

FIG. 9 shows a zoomed-in view of a situation in which the vessel 14 is quickly accelerating (i.e., is accelerating at a rate above the threshold rate). Here, an exemplary pulse 98 is sent to the trim-out relay 36 in response to the controller 38 determining that the actual trim position at that time is less than the target trim position by greater than the first error threshold (see arrow 100). However, instead of de-energizing the trim-out relay 36 when the actual trim position is still less than the target, the pulse 98 continues until the actual trim position is equal to the target, as shown at arrow 102. After the pulse 98 is discontinued, the trim system then coasts and the actual trim position (curve 78) overshoots the target trim position (curve 76) as shown between arrows 102 and 104. However, as shown at arrow 104, the target trim position 76 (which was increasing according to the auto-trim algorithm) has meanwhile caught up to the coasting actual trim position 78. This is due to careful calibration of the magnitude above which an acceleration rate will result in catching up of the target trim position to the coasting actual trim position.

Figure 10:
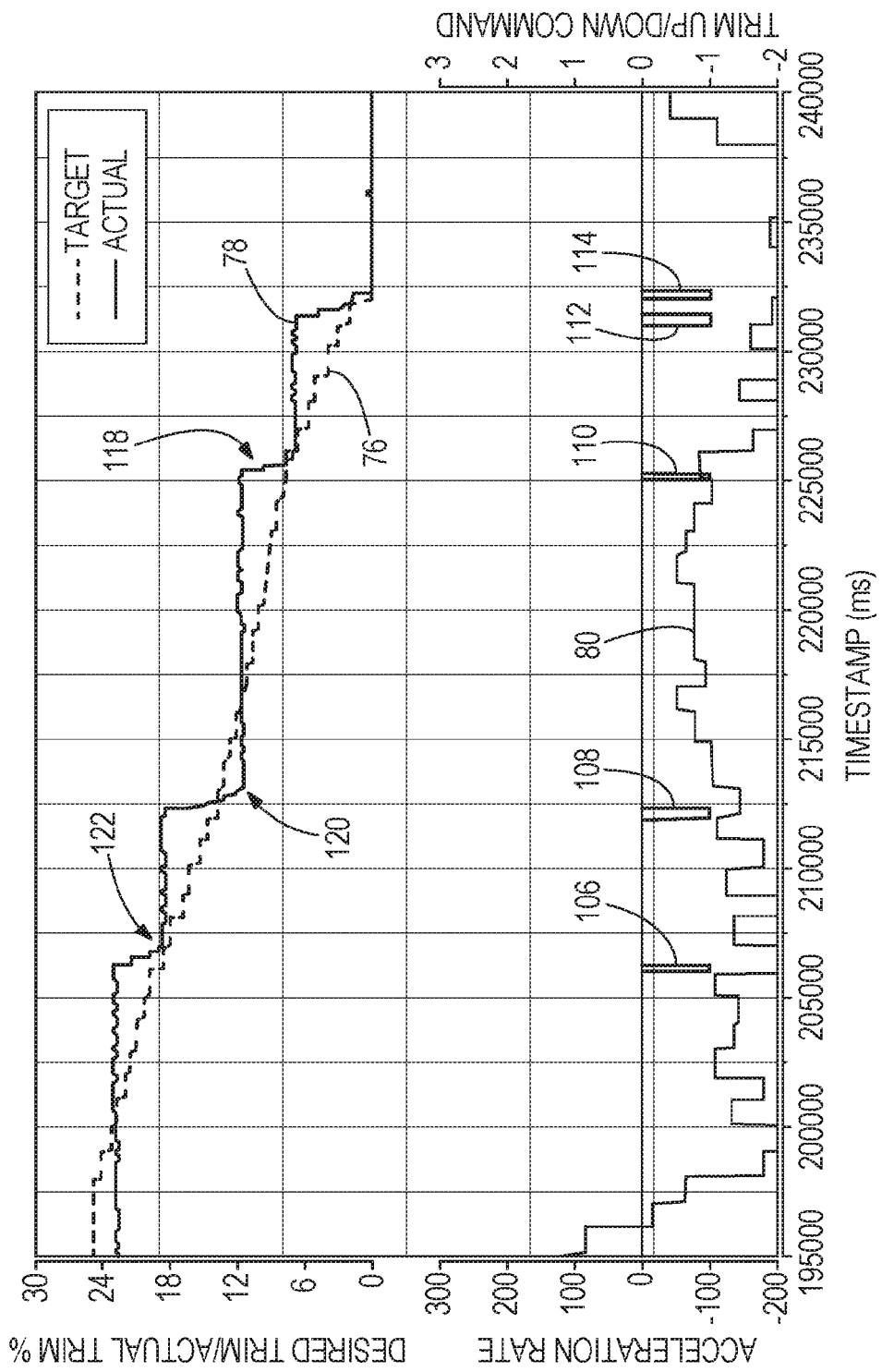
FIG. 10 is a chart showing a relationship between time and acceleration rate and between time and trim position when a vessel is slowly decelerating.
Figure 11:
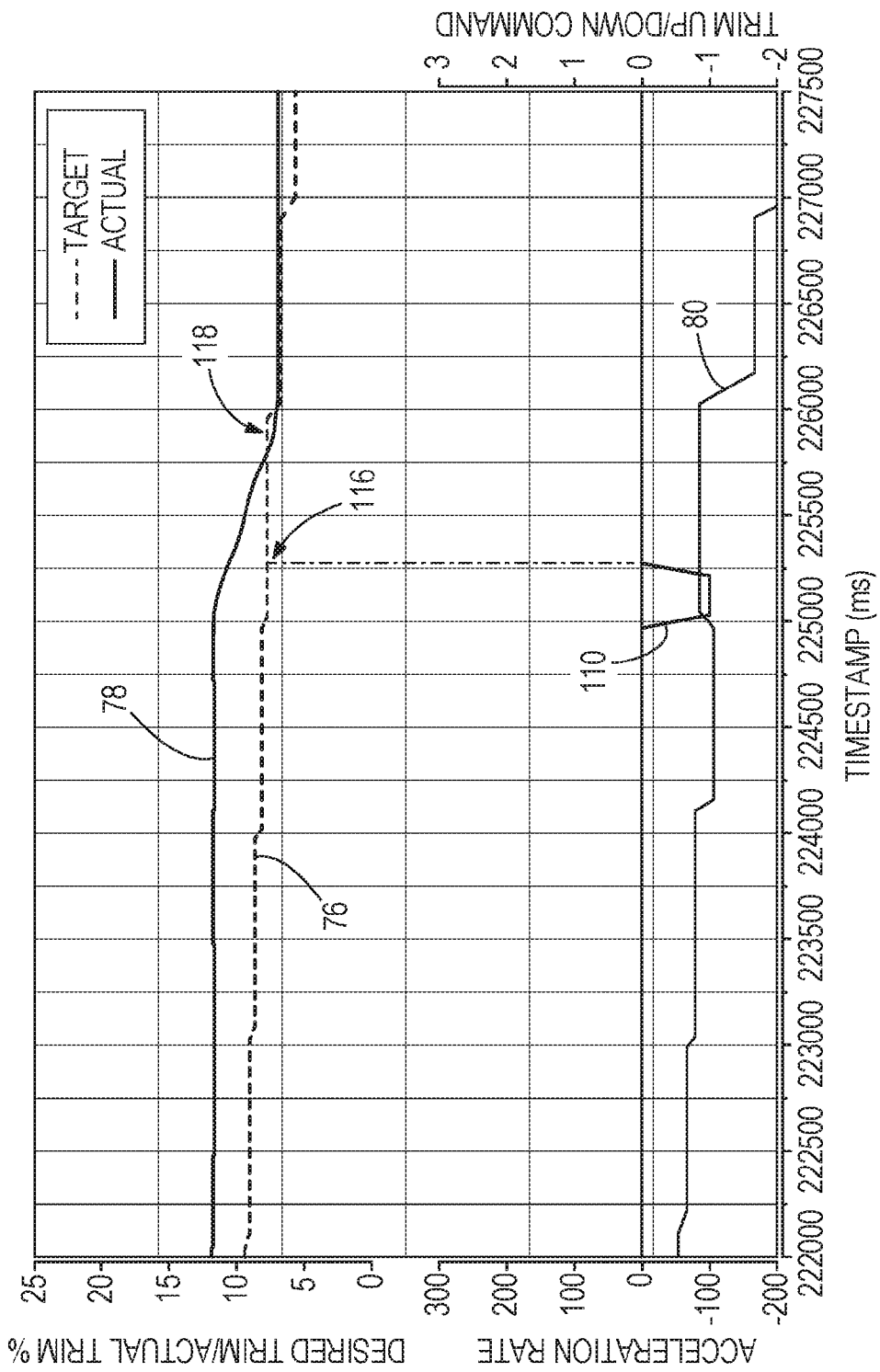
FIG. 11 is a zoomed-in view of a portion of FIG. 10.

FIG. 10 shows a situation in which the vessel 14 is slowly decelerating (i.e., is decelerating at a rate below the threshold rate). Here, exemplary trim-down pulses are sent as shown by 106, 108, 110, 112, and 114 to the trim-in relay 34. This is in response, for example, to the actual trim position being greater than the target trim position by more than the first error threshold at a given point in time. See, for example, the actual and target trim positions at about 225000 mS in FIG. 11, which shows a zoomed-in view of FIG. 10, and how pulse 110 begins in response to trim error. The pulse 110 is stopped when the actual trim position is within a given range of the target trim position, which range may be determined according to the table in FIG. 5 as described above. At this point in time, the actual trim position is still higher than the target, see 116, but as time goes on, the trim system coasts down to the target trim position, as shown at 118. Returning to FIG. 10, by using the present method there may be some amount of undershoot, as shown at 120, but in general the calibrations of the present method ensure that any undershoot is negligible, and most often does not exist, as shown at 122 and 118. It can be seen from examination of FIGS. 10 and 11 that the method thus also includes setting the setpoint trim position to a value that is greater than the target trim position when the acceleration rate is negative, after which the marine device coasts down to the target trim position. In other words, the given range is added to the target trim position to obtain the setpoint trim position.

Thus, disclosed herein is a system 44 for controlling a trim position of a trimmable marine device 10 with respect to a marine vessel 14. The system includes a controller 38 that determines a target trim position of the marine device 10 based on a condition of the marine vessel 14, such as vessel speed, engine speed, etc. A trim position sensor 62 senses an actual trim position of the marine device 10 and sends actual trim position information to the controller 38. A trim actuator 16 is coupled to the marine device 10 and configured to rotate the marine device 10 about a horizontal trim axis 13 in response to commands from the controller 38. The controller 38 determines at least a magnitude of an acceleration rate of the marine vessel 14, and in response to determining that the magnitude of the acceleration rate exceeds a given rate threshold, the controller 38 commands the trim actuator 16 to rotate the marine device 10 until the trim position sensor 62 indicates that the actual trim position equals the target trim position. In response to determining that the magnitude of the acceleration rate does not exceed the given rate threshold, the controller 38 commands the trim actuator 16 to rotate the marine device 10 until the trim position sensor 62 indicates that the actual trim position equals a setpoint trim position that is different from the target trim position. Thus, the vessel's acceleration rate (both its magnitude and sign) can be used to predict which direction the trim target is going and to adjust the setpoint trim position accordingly. This reduces the number of adjustments needed per trim position correction.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for controlling a trim system on a marine vessel, the method comprising:
   receiving an actual trim position of a trimmable marine device at a controller;
   determining a trim position error by comparing the actual trim position to a target trim position with the controller;
   determining an acceleration rate of the marine vessel, wherein the acceleration rate has a magnitude;
   in response to determining that the trim position error exceeds a first error threshold and the magnitude of the acceleration rate exceeds a given rate threshold, commanding the marine device to the target trim position with the controller;
   in response to determining that the trim position error exceeds the first error threshold and the magnitude of the acceleration rate does not exceed the given rate threshold, commanding the marine device to a setpoint trim position that is different from the target trim position with the controller; and
   trimming the marine device with a trim actuator in response to the controller commanding the marine device to one of the target trim position and the setpoint trim position.

2. The method of claim 1, wherein commanding the marine device to the target trim position comprises commanding the trim actuator to move the marine device toward the target trim position until the controller determines that the actual trim position is equal to the target trim position.

3. The method of claim 2, wherein commanding the marine device to the setpoint trim position comprises commanding the trim actuator to move the marine device toward the target trim position until the controller determines that the actual trim position is within a given range of the target trim position.

4. The method of claim 3, wherein the given range is a calibrated value.

5. The method of claim 4, wherein the given range has a magnitude that is inversely related to the magnitude of the acceleration rate of the marine vessel.

6. The method of claim 3, further comprising setting the setpoint trim position to a value that is less than the target trim position when the acceleration rate is positive.

7. The method of claim 6, further comprising setting the setpoint trim position to a value that is greater than the target trim position when the acceleration rate is negative.

8. The method of claim 1, further comprising determining the target trim position with the controller based on vessel speed.

9. The method of claim 8, wherein the trim system is a hydraulic trim system and the marine device is an outboard motor coupled to the marine vessel.

10. The method of claim 1, further comprising comparing the trim position error to a second error threshold, and commanding the marine device to one of the target trim position and the setpoint trim position in response to the trim position error exceeding both the first error threshold and the second error threshold.

11. A system for controlling a trim position of a trimmable marine device with respect to a marine vessel to which the trimmable marine device is coupled, the system comprising:
   a controller that determines a target trim position of the marine device based on a condition of the marine vessel;
   a trim position sensor that senses an actual trim position of the marine device and sends actual trim position information to the controller; and
   a trim actuator coupled to the marine device and configured to rotate the marine device about a horizontal trim axis in response to commands from the controller;
   wherein the controller determines at least a magnitude of an acceleration rate of the marine vessel;
   wherein, in response to determining that the magnitude of the acceleration rate exceeds a given rate threshold, the controller commands the trim actuator to rotate the marine device until the trim position sensor indicates that the actual trim position equals the target trim position; and
   wherein, in response to determining that the magnitude of the acceleration rate does not exceed the given rate threshold, the controller commands the trim actuator to rotate the marine device until the trim position sensor indicates that the actual trim position equals a setpoint trim position that is different from the target trim position.

12. The system of claim 11, wherein the setpoint trim position is within a given range of the target trim position.

13. The system of claim 12, wherein the given range has a magnitude that is inversely related to the magnitude of the acceleration rate of the marine vessel.

14. The system of claim 12, wherein the trim actuator comprises:
a hydraulic pump-motor combination;
a piston-cylinder assembly having a first end coupled to the marine vessel and a second end movable with respect to the first end and coupled to the marine device;
a first hydraulic line coupling the pump-motor combination to a first chamber at the first end of the piston-cylinder; and
a second hydraulic line coupling the pump-motor combination to a second chamber at the second end of the piston-cylinder.

15. The system of claim 14, wherein the given range is a calibrated value that depends on one or more of a time it takes a valve between the pump-motor combination and the piston-cylinder assembly to close, an amount of expansion of the first and second hydraulic lines, and inertia of the pump-motor combination.

16. The system of claim 15, further comprising a look-up table stored in a memory of the controller and containing a plurality of calibrated values for the given range, each calibrated value in the plurality of calibrated values being related to a given acceleration rate of the marine vessel.

17. The system of claim 16, wherein when a particular acceleration rate of the marine vessel is not in the look-up table, the controller interpolates the given range using a first calibrated value associated with an acceleration rate that is greater than the particular acceleration rate and a second calibrated value associated with an acceleration rate that is less than the particular acceleration rate.

18. The system of claim 11, wherein the controller determines a trim position error by comparing the actual trim position to the target trim position and commands the trim actuator to rotate the marine device to one of the target trim position and the setpoint trim position only if the trim position error exceeds an error threshold.

19. The system of claim 11, wherein the marine device is an outboard motor.

20. The system of claim 11, wherein the given rate threshold has a different magnitude when the acceleration rate of the marine vessel is positive than when the acceleration rate of the marine vessel is negative.

* * * * *